Aug. 4, 1959  J. F. T. BERLINER  2,898,260
FIBER BOARD AND PROCESS OF MAKING SAME FROM DESERT SHRUBS
Filed July 12, 1954
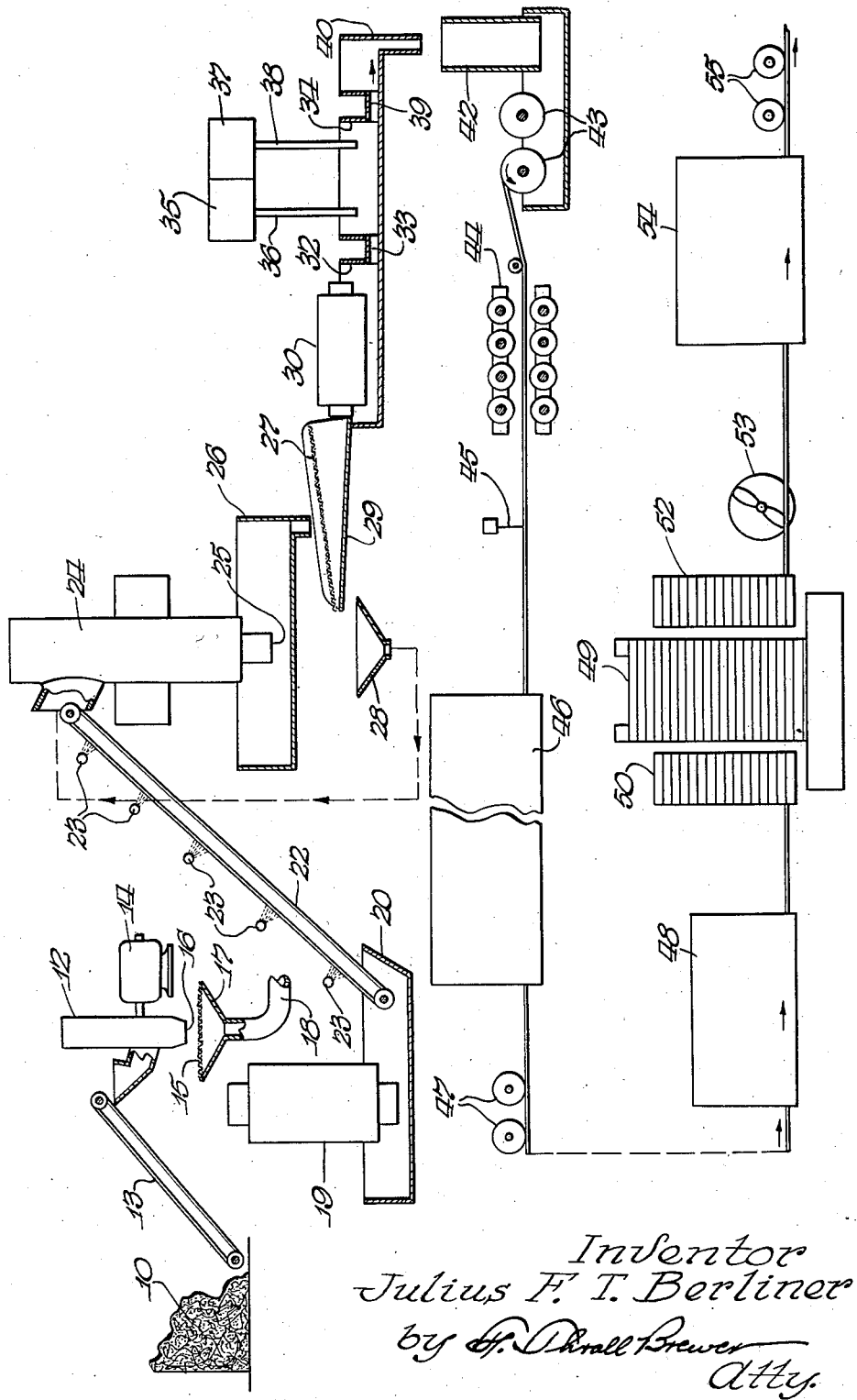
Inventor
Julius F. T. Berliner
by H. Thrall Brewer
Atty.

United States Patent Office 2,898,260
Patented Aug. 4, 1959

2,898,260

FIBER BOARD AND PROCESS OF MAKING SAME FROM DESERT SHRUBS

Julius F. T. Berliner, Chicago, Ill.

Application July 12, 1954, Serial No. 442,637

9 Claims. (Cl. 162—11)

This invention relates to fiber board, particularly that of the hardboard type, and to a process of making such fiber board from wood tissue of desert shrubs, which wood tissue, when processed, yields materials that serve as binders to bond the fibers together in the board formed therefrom.

One of the general objects of my invention is to provide a fiber board of the hardboard type in which wood fibers are bonded together by binding materials of the thermosetting type, which binding materials are derived from natural constituents of the wood fibers.

My invention has for another general object the production of a high quality fiber board product from the wood fibers of desert shrubs which are available in large quantities in areas accessible for use and which regrow within a reasonable time after being cut.

Considered somewhat more specifically, my invention comprehends a process for the production of hardboard from wood fibers which naturally contain constituents productive of binders which bond the fibers together to form a strong and highly moisture repellent board, as well as a hardboard made by such process and embodying thermosetting binders.

As another object, this invention has within its purview the provision of a hardboard product and a process of producing such product, and wherein both the product and process are characterized by the use of natural constituents of the wood fibers of desert shrubs to produce thermosetting binders for bonding together those wood fibers alone or those wood fibers mixed with other longer cellulosic fibers.

Another object of the invention is to provide a hardboard and a method of producing it which are characterized by the utilization of natural constituents of the wood fibers to produce precursors of thermosetting binders and the activation of those binders by the application of heat and pressure to the fibrous material in its substantially dry state to produce a strong, hard and moisture resistant board having smooth surfaces.

It is a feature of this invention that by steam digestion of natural wood fibers of certain desert shrubs which contain relatively large quantities or proportions of pentosans, the pentosans are converted to furfurals in sufficient quantities to react with other natural constituents of that wood to produce precursors of binders which are thermosetting in character.

A further feature of my process is that the chemical reaction required for the desired conversion of pentosans of the wood fibers to furfurals and the requisite production of thermosetting binders can be determined during steam digestion of the wood fibers by the development of a pH value within predetermined limits during the progress of the digesting process.

My invention additionally comprehends a hardboard and process of making such hardboard from the wood fibers of desert plants containing resins of the phenolic types.

As another object, this invention has within its purview the removal of the bark from the wood of desert shrubs in order to speed the formation of a wet mat from the wood fibers and also to produce a resultant board of a lighter color than when the bark is left on.

It is also within the purview of the present invention to provide a material for the production of hardboard which enables various thicknesses of finished board to be produced from mats of uniform thickness by the placement of one or a plurality of superimposed dried mats in a press for the application of heat and pressure to activate the normal bonding substances of the material.

These and other objects of this invention will become apparent from the detailed description when taken together with the accompanying drawing in which:

The single figure is a diagrammatic illustration which provides a general disclosure of the various steps and the apparatus utilized to carry out the process which constitutes one phase of my invention herein disclosed for making hardboard from the wood fibers of desert shrubs, which product of the disclosed process constitutes another phase of this invention.

One consideration in the manufacture of fiber board, and particularly that known as hardboard, is the provision of a source of material adapted to such hardboard production, and which source is not only adequate in nature and quantity to supply production facilities representing a large investment, but which also affords material from which the fiber board or hardboard products can be economically produced. In these respects, I have found that many shrubs which grow naturally in the desert regions of the southwestern United States and those of northern Mexico, and elsewhere, provide sources of material which admirably fulfill the requirements for the production of hardboard. While comparisons of the specific properties of various individually identifiable desert shrubs, such, for example, as the economy of harvesting from their natural habitats, their accessibility with adequate freedom from mixture with other undesirable plants, the sufficiency of the quantities within a reasonable range, their ability to reestablish usable growth after each harvesting within a reasonable period of time, and the percentages of desirable constituents in the harvested growth, are influential in the selection of material sources for commercial use, it has been found that various varieties of such shrubs are well suited for the intended purpose.

Examples of specific types of desert shrubs which have been found to be suitable for the production of hardboard by the process herein disclosed are as follows: (1) the creosote bush (*Larrea divaricata*); (2) mesquite (of which there are several varieties, the most important of which are *Prosopis juliflora*, *Prosopis velutina*, *Prosopis pubescens*, *Prosopis chilensis*, *Prosopis glandulosa* and *Prosopis odorata*); (3) catclaw (of which there are several varieties coming within the general classification of mesquite and including *Acacia gregii*); (4) blackbrush (of which there are varieties including *Acacia amenfacea* or *Flourensia cernua*); (5) blackbrush (*Coleogyne ramosissima*); (6) greasewood (*Sarcobatus vermiculatus*); (7) saltbush (*Atriplex polycarpa*); (8) sagebrush (*Artemisia tridentata* and other varieties). The mesquite, catclaw and blackbrush belong to the legume family. Various common means by which some of these varieties of legumes are known are honey mesquite, western mesquite, screwbean mesquite, catclaw mesquite and velvet mesquite.

While the creosote bush, which belongs to the family Zygophyllaceas, and those desert shrubs which have been designated as belonging to the legume family are considered to be preferred sources of material for the production of hardboard, because of their availability, accessibility and the ultimate characteristics of the board produced therefrom, all of the aforementioned varieties, and possibly others, are considered to come within the range and scope of this invention and to be adapted to treatment in accordance with the process disclosed and claimed herein. It is further to be noted that the wood of the various types of desert shrubs can be intermixed for the production of satisfactory hardboard. It is also considered to be of importance that the wood fibers of the various desert shrubs are adapted to mixture with other cellulosic fibers, such as cotton stalk pulp and paper pulps for producing very satisfactory hardboard. Generally, the cotton stalk pulp and paper pulps which are desirable for use when mixed with the fibers of wood from the desert shrubs are of greater length than those of the desert shrubs, and it has been found that from 2% to 30% by weight of the added cellulosic material can be incorporated with the wood fibers of the desert shrubs.

All of the desired shrubs to which specific reference has been made and which are particularly adapted to use in my disclosed process for producing the hardboard of this invention have the common characteristic of embodying pentosans and resins as natural constituents of the wood and its bark. Compared to generally known hard and soft woods, the pentosan content of the wood of the desert shrubs is relatively high. For example, soft woods, such as that of the various types of pine and spruce trees contain from 4% to about 12% by weight of pentosans on a dry basis. Hard woods, such as hard maple and birch contain from 18% to 22%. Woods from the creosote bush and mesquite, on the other hand, have been found to contain approximately 34% of pentosans by weight on a dry basis, which amount is quite considerably in excess of that of the hard and soft wood of trees. The cresote bush in particular has been found to contain significant quantities of phenolic type compounds which are reactive with furfural to form resins. Because of these natural constituents of the wood fibers of the desert shrubs, the treatment of the wood in accordance with my disclosed process produces precursors of thermosetting binders from the natural wood ingredients, which precursors of the binders are adapted to activation by heat and when pressure is applied to the felted fibers to bond the fibers together into a hardboard having very desirable strength and moisture absorption characteristics. In fact, untempered hardboard made in accordance with this invention has been found to have strength characteristics comparable to those of present types of commercially produced tempered hardboards, and the moisture absorption has been found to be lower than that of the commercially tempered hardboards.

The resins naturally present in the wood and bark of the creosote bush, for example, and on its surface are soft to hard thermoplastic resins which are soluble in aqueous alkali and are precipitated from alkali solutions upon the addition of acids. The resins also contain catechol derivatives and other unidentified phenolic type constituents. These resins are capable of reacting with formaldehyde, furfural and other aldehydes to form thermosetting resins. There are also some ketonic materials and certain of the flavones present which have been identified. Some of the latter materials also react with aldehydes.

Since the fibers of the creosote bush and other desert shrubs of the types referred to are relatively short, the unpressed felted fibers or mat may be more readily handled while in their wet state without breakage by the incorporation of some longer fibered cellulosic material, such as cotton stalk pulp or paper pulp with the wood fibers of the desert shrub or shrubs. From 2% to 30% of the longer fibered cellulosic material can be incorporated with the wood fibers of the desert shrubs without impairing the physical properties of the finished hardboard product to provide greater ease of handling the wet mass or mat without breakage. It is further significant that hardboard made from a blend of the wood pulp of the creosote bush with the pulps from other desert shrubs listed as being of the legume variety have properties which are indistinguishable by physical tests from hardboard made entirely of creosote bush pulp when 25% or more of the creosote bush pulp is utilized in the mixture.

In the practice of my herein-disclosed invention, a desert shrub of the type referred to is harvested or gathered from its place of natural growth in desert areas by being cut close to the ground and gathered, after which cutting the plant regrows from the root growth which is left in the desert soil. The regrowth to full or usable stature requires only three to seven years, depending upon climatic conditions and moisture. After being harvested, a short period of time is allowed for the drying of the leaves, after which they readily fall off of the plant during the subsequent handling. The harvested shrub is then chopped into small pieces to facilitate handling and loading. The chopped pieces of the wood, which are preferably in the size range of 2 to 5 inches in length and their normal diameter, which usually varies from approximately ¼ inch to 1½ inches, may be stored in a pile ready for use at a place convenient to the plant at which the hardboard is to be produced.

Although the removal of the bark from the wood is not essential to the production of high grade hardboard from the wood of a desert shrub, such as the creosote bush, I prefer to remove at least a part of that bark, because such removal of the bark results in the production of a lighter colored hardboard and also has a tendency to improve the rate of production of the mat at one stage of the process. The bark, when left on the wood pieces produces fine particles which form a mud that has a tendency to clog a screen upon which the fibers are felted, thereby materially reducing the rate of the passage of water through the screen and the consequent rate of the formation of the felt or mat on the screen. The details of the process of removing the bark from the chopped wood pieces constitutes the subject matter of my copending patent application Serial No. 444,787, filed July 21, 1954, and entitled Method of Processing Raw Wood, and now U.S. Patent No. 2,835,292, and it is believed that for purposes of this application it is sufficient to assert that practically all of the bark is removed from the wood pieces by a process which is mechanical in its nature. The bark, because it becomes finely divided, is separated from the wood pieces by screening.

Having reference to the accompanying drawing, my preferred process of producing hardboard from the wood of desert shrubs containing pentosans and resins progresses from the point of utilizing gathered and cut pieces of wood of the type described from a stack 10 which comprises a source of supply at a location convenient to the manufacturing plant. The cut wood pieces from the stack 10 are, in the disclosed process, carried from the stack to a debarking machine 12 by means such as a conveyor 13. The debarking machine 12, as has been previously mentioned, mechanically effects removal of practically all of the bark from the wood pieces, and in the form disclosed, is operated by a motor 14. The bark and wood pieces are discharged from the debarking machine 12 onto a screen through a discharge opening 16 in the debarking machine. The screen 15 separates the wood pieces from the more finely divided bark and effects a separation, so that the bark is gathered in a hopper 17 below the screen 15 and removed therefrom through a discharge conduit 18. The debarked wood pieces from the screen 15 are fed into a steam digester 19, which digester may be one of a type known in the industry and preferably lined with stainless steel or other corrosion resistant material, wherein the wood pieces are subjected to the direct digesting action of steam under pressure of from 50 to 200 pounds per square inch. A pressure of 100 pounds per square inch has been found to be quite satisfactory.

The wood pieces which are introduced into the digester 19, of course, include the wood of a desert shrub, such as the creosote bush or one or more of the designated legume plants. If desired, and as previously mentioned, the wood of a longer fibered ligno-cellulosic material may be utilized, and is mixed with the wood of the desert shrub when that wood is put into the digester. Specifically, the longer fibered material may comprise cotton stalks, pine wood chips, or wood of other of the longer fibered species of trees, such as spruce, juniper, cottonwood or aspen. As previously mentioned, the percentage of the longer fibered ligno-cellulosic material may vary from 2% to 30% by weight, as compared to the weight of the wood of the desert shrub, but usually from 4% to 8% by weight of the longer fibered material is utilized. By adding the longer fibered material to the wood pieces of the desert shrub as it is introduced into the digester, the digestion of the entire mass is accomplished in one operation. If found desirable, it is understood that the longer fibered material may be separately digested and added to the digested wood of the desert shrub at a later point in the production process.

Generally speaking, the time required for the digestion of the wood pieces in the digester by the action of steam is the amount of time necessary to bring the full charge of the digester up to the operating temperature of the steam at the pressure of operation, in addition to sufficient time to soften and loosen the fibers of the wood pieces and further to produce certain chemical changes and reactions between the constituents of the woody material. When utilizing the wood of the desert shrubs which are herein set forth, the pentosans which are naturally present in the woody material are converted into furfurals in the digester, and the furfurals react with other constituents of the wood, such as with the natural phenolic compounds present in the designated desert shrubs and with the lignins or the products of the hydrolysis of the lignins. The reactions which take place in the digester produce an acidic condition in the material and result in the production of precursors for thermosetting resins or resin forming bodies which subsequently produce thermosetting resins which are effective to bond the wood fibers together when subjected to later applied heat and pressure.

When a pressure of approximately 100 pounds per square inch is utilized in the digester, the time required for reaching an acidity indicated by a pH value between 4 and 3 is approximately 1½ to 2 hours. The material in the digester should be maintained at the elevated temperature of digestion for a period of about 15 to 45 minutes after reaching an acidity value between a pH of from 4 to 3. The length of time required to attain full temperature within a particular digester is, of course, dependent upon the size of the digester and the amount of material contained therein. At steam pressures higher than 100 pounds per square inch, the time required for digestion is reduced. In either instance, the optimum pH value reached by the material for good conversion of the constituents is between approximately 3.4 and 3.6. During the described digestion process and when the designated materials are utilized, the pentosans naturally present in the wood fibers are converted into furfurals, and the excess of those furfurals may be recovered by condensation of the steam from the exhaust.

Under the outlined conditions of digestion, certain soluble materials, such as sugars, tannins, gums, hydrolizable pentosans and celluloses are removed from the wood and are contained in the liquor in the digester. The resulting steam digested wood product is relatively high in ligno-cellulose, the contained amount of such material being in excess of about 85%.

The digested material is discharged from the digester into a pit which is designated diagrammatically in the accompanying drawing by the reference numeral 20. The material from this pit, as designated in the drawing, is carried away on a conveyor 22, and while being thus conveyed is rinsed with water from outelts, such as spray nozzles diagrammatically depicted at 23 in the drawing, for the purpose of removing the digester liquors which contain soluble extracts from the digested wood. From the conveyor 22, the washed wood chips are discharged into a refiner 24 of a type well known in the art for conversion in that refiner to pulp by the separation of the wood fibers. As in the instance of the digester, the refiner utilized in my disclosed process should preferably be lined with stainless steel or other corrosion resistant material.

Pulp from the refiner 24 is discharged therefrom through a discharge opening 25 into a pulp stock chest 26. Pulp from the pulp stock chest 26 is fed onto a screen 27 to separate therefrom any unpulped portions of the wood fiber, which portions are gathered in a hopper 28 and fed back to the refiner or to auxiliary apparatus for further refinement. The pulped fibers pass through the screen and are fed from a hopper 29 below the screen to a washer and thickener 30 wherein undesirable particles and soluble matter are removed. If a longer fibered material is to be utilized with the pulp derived from the wood of the desired shrub or shrubs, and if that longer fibered material is not incorporated with the wood pieces of the desert shrub in the digester, then the separately digested longer fibered pulp may be mixed with the digested fibers of the desert shrub at the point of the discharge from the washer and thickener 30, the material from the washer and thickener 30 being discharged into a vat 32 which is connected through a flow conduit 33 with a vat 34.

To impart water repellency, sizing materials are added to the pulp in the vat 34. In my disclosed process, I add approximately 1% of a rosin by weight on a dry basis, or other suitable size from a storage tank 35 to the pulp in the vat 34 through a suitable supply line 36. The rosin is then precipitated by acidifying the pulp in the vat 34 by the addition thereto of a trivalent metal salt, such as aluminum sulphate from a supply tank 37 through a suitable supply conduit 38. The quantity of the metal salt, such as aluminum sulphate, which is added to the pulp is an amount sufficient to produce an acidity between a pH value of 4.5 and 7.0.

Pulp from the vat 34 passes through a conduit 39 into a consistency regulator 40, wherein the pulp is diluted to a consistency of between 0.2% and 1.5% of fiber. Pulp from the consistency regulator 40 passes into a head box 42 from which it is supplied to a machine of one of the well known types for conversion to a felted mat. In the drawing, a cylinder type of mat forming machine 43 is illustrated. This machine gathers the pulp and forms a wet felted mat of a desired thickness, which mat is then passed through a roll press 44 for the removal of a large portion of the water and for pressing into a consolidated mat of predetermined thickness. For most purposes, the thickness of the wet pressed mat is from ½ inch to ⅝ inch. The wet mat is then trimmed at its edges by a wet saw 45 which, in the present instance, constitutes a jet of water. Pieces thus trimmed and cut may be, for example, 4 to 5 feet wide and in lengths up to 18 feet. At this stage, the wet board contains from about 55% to 70% water, and is conveyed into a drying oven 46 for the evaporation of the water. In this oven the water content of the board is reduced to approximately 6%.

The relatively dry felted fiber boards from the dryer 46 are trimmed by saws 47 and then conveyed into a high frequency electrical preheating unit 48 in which they are further dried and heated to a temperature of approximately 300° F. This preheating and additional drying insures that the boards are as dry as possible and also reduces the time required for heating the boards in the subsequent hot pressing operation which activates the thermosetting binders to bond the wood fibers into a hard and moisture resistant board. For the mentioned hot press operation, a press 49, in the present instance, is diagrammatically depicted as being equipped with an automatic press loader 51 and an automatic press unloader 52.

By virtue of the fact that the mat boards are in a practically bone dry state when they enter the press 49 for the hot pressing operation, there is practically no steam emitted from the boards during that hot pressing operation and smooth platens can be used on opposite sides of each of the boards, thereby to produce boards having both faces smooth, as distinguished from those to which a screen pattern is imparted by the screen utilized to permit the escape of steam from the pressing of wet boards. It is understood, of course, that when desired, either one or both of the platens may have an embossed pattern thereon which will be imprinted upon either one or both of the board surfaces, when used. It is further to be understood that the press carries several layers of board at one time with plates interposed between the boards, so that a stack of alternate boards and plates is interposed between the press platens.

For effecting activation of the thermosetting resins or binders in the fibers of the matted boards made in the manner described from the wood of desert shrubs, I utilize temperatures between 430° F. and 480° F. for the press platens and plates and compress the boards at a pressure which may range from 800 to 1200 pounds per square inch. The pressing operation requires from 0.75 minute to 3 minutes, during which a dried mat board having a thickness of approximately ½ inch is reduced to approximately ⅛ inch in thickness and the thermosetting constituents in the processed wood fibers effectively and permanently bond those fibers into a condensed and moisture resistant mass. Upon being removed from the press 49, the boards are cooled rapidly by a blast of air produced by a fan 53 and are subjected to moist air in a humidifier chamber 54 in order to minimize warping of the boards. As a final step, the boards are trimmed by saws 55 and are then ready for inspection and shipment.

It has been found that with the materials utilized in my process, boards of a thickness greater than that normally produced from a single mat of predetermined thickness can be made by superimposing two or more mats as they are emitted from the preheater 48 and pressing those superimposed mats together in the press 49. The binders which are normally present in the mats and which are derived from natural constituents of the wood of the desert shrubs eliminate the necessity of using added binders or adhesive between the superimposed mat boards in order to effect the production of an integrated thicker board of substantially homogeneous structure and devoid of any indications or lines of demarcation between the mat boards which are superimposed in the production. It naturally follows that by utilizing dried mat boards which ordinarily produce hardboard of ⅛ inch thickness, hardboards of ¼ inch, ⅜ inch or ½ inch thickness can be produced by superimposing mat boards which respectively embody two, three or four of the standard mat boards. In the production of the thicker boards, it also follows that the time of the hot pressing operation must be lengthened in order to allow the entire mass of the thicker board to become completely heated for effecting the activation of the binders.

In some instances, the finished hardboard product produced as herein described may be treated by impregnation with a drying oil, such as linseed oil, tung oil or blown castor oil, followed by baking to oxidize or dry the oil. This oil treatment is used in the production of processed or "tempered" hardboard. The strength and water resistance of the board are materially improved by the oil treatment.

From the foregoing description, it may be readily understood that by the use of my invention, as herein disclosed, I have produced from the wood of one or a variety of desert shrubs which naturally embodies pentosans and resins, or from combinations of such woods with one another or with other wood fibers, a consolidated hardboard in which the binders are thus derived from natural constituents of the wood and are activated in a substantially bone dry condition by being subjected to heat and pressure to produce a hard, strong, and moisture resistant board in which the fibers are bonded together by thermosetting resins.

It is also apparent from the foregoing description and reference to the accompanying drawing that I have developed a process for the production of a hardboard having highly desirable characteristics, which process utilizes the wood of desert shrubs that naturally contain pentosans and resins, and which process effects the conversion of the natural constituents of the wood into thermosetting binders activated by the application of heat and pressure to bond the fibers into a hard, dense, strong and moisture resistant mass.

Although my invention has been described in connection with specific details of the embodiments thereof, it must be understood that it is not intended to be limited thereto except in so far as set forth in the accompanying claims.

Having thus described my invention, what I claim as new and desire to secure by Letters Patent of the United States is:

1. The process of making a hardboard product from the wood fibers of a desert shrub which naturally contain resin constituents and pentosans and which process comprises the steps of subjecting chips of wood which naturally contains resin constituents and pentosans to the digesting action of steam at a pressure of from 50 to 200 pounds per square inch for a time sufficient to convert the pentosans to furfurals and for the furfurals to react with other constituents of the wood, thereby to form precursors of thermosetting binders in the wood fibers, forming a felted sheet of the wet digested wood fibers, drying the felted sheet to the extent that it contains less than 10% moisture by weight, heating and further drying the sheet to a substantially bone dry state, and subjecting the hot and dried sheet to mechanical pressure of 700 to 1400 pounds per square inch between platens and a temperature between 400° and 500° F. to consolidate and bond the wood fibers into a hard thermoset sheet.

2. The process of making a hardboard product as defined in claim 1, and further characterized by the superimposing of a plurality of the dried felted sheets at the time of subjecting the sheets to heat and pressure for consolidation and bonding, thereby to form a thicker finished sheet of hardboard.

3. The process of making a hardboard product as defined in claim 1, and wherein the steam digesting of the wood chips is continued from 15 to 45 minutes after the material being digested reaches a pH value between 4 and 3.

4. The process of making a hardboard product as defined in claim 1, and further characterized by the step of removing a large proportion of the bark from the wood chips prior to their being subjected to the digesting action of steam.

5. The process of making a hardboard product embodying wood fibers of a desert shrub having a relatively high proportion of pentosans as a natural ingredient and which process comprises the steps of subjecting chips of wood containing pentosans in excess of 15% of the dry weight of the wood as natural ingredients to the digesting action of steam at a pressure in excess of 50 pounds per square inch for a time in excess of that required to bring the pH of the digesting wood chip material to a value between 4 and 3, thereby to convert natural ingredients of the wood chips to precursors of thermosetting binders, forming a felted mat of the digested wood fibers while wet, reducing the water content of the felted mat to less than 10% by weight, and heating the felted mat of reduced water content to a temperature in excess of 400° F. to activate the thermosetting binders while pressing the said felted mat to effect the consolidation and bonding of the wood fibers.

6. The process of making a hardboard product as defined in claim 5, and wherein the digesting of the wood chips is carried out at a pressure of approximately 100 pounds per square inch.

7. The process of making a hardboard product as defined in claim 5, and further characterized by the steps of adding approximately 1% of rosin by weight to the digested wood fibers, and then adding to the digested wood fibers a trivalent metal salt in an amount sufficient to establish the pH thereof at a value between 4.5 and 7.0.

8. The process of making a hardboard product as defined in claim 5, wherein the water content of the felted mat is reduced to approximately 6% by weight, and which is further characterized by the step of preheating the felted mat of reduced water content to approximately 300° F. preparatory to the application of heat and pressure for consolidating and bonding the wood fibers.

9. Hardboard as the product of claim 5.

References Cited in the file of this patent

UNITED STATES PATENTS

| Number | Name | Date |
|---|---|---|
| 38,020 | Allen | Mar. 31, 1863 |
| 1,578,609 | Mason | Mar. 30, 1926 |
| 1,586,159 | Mason | May 25, 1926 |
| 1,697,702 | Weston et al. | Jan. 1, 1929 |
| 1,716,623 | Collins | June 11, 1929 |
| 1,753,775 | De Cew | Apr. 8, 1930 |
| 2,037,522 | Lundbach | Apr. 14, 1936 |
| 2,080,077 | Howard et al. | May 11, 1937 |
| 2,080,078 | Mason et al. | May 11, 1937 |
| 2,093,267 | Dunbar | Sept. 14, 1937 |
| 2,120,137 | Mason | June 7, 1938 |
| 2,140,189 | Mason | Dec. 13, 1938 |
| 2,198,269 | Linzell et al. | Apr. 23, 1940 |
| 2,215,245 | King et al. | Sept. 17, 1940 |
| 2,215,353 | Gill | Sept. 17, 1940 |
| 2,224,135 | Boehm | Dec. 10, 1940 |
| 2,234,126 | Mason | Mar. 4, 1941 |
| 2,234,188 | Morgan et al. | Mar. 11, 1941 |
| 2,237,295 | Atkin | Apr. 8, 1941 |
| 2,373,689 | Kenda | Apr. 17, 1945 |
| 2,373,690 | Kenda | Apr. 17, 1945 |
| 2,404,840 | Harvey | July 30, 1946 |
| 2,608,492 | Mueller | Aug. 26, 1952 |
| 2,634,208 | Miscall | Apr. 7, 1953 |

OTHER REFERENCES

Schorger: The Chemistry of Cellulose and Wood, 1926, pp. 362–363.

West: "Papermaking Materials," C.P. 1928, pp. 34, 178, 138, published by T.A.P.P.I.

Report of Third International Conference for Timber Utilization, Paris, July 26–28, 1937, p. 95, Special Report 16/17.

Boehm: Paper Trade J., May 2, 1940, pp. 35–38.

Dohne et al.: Paper Trade J., Nov. 27, 1941, pp. 138–144.